United States Patent
Chan

(10) Patent No.: US 8,260,879 B2
(45) Date of Patent: Sep. 4, 2012

(54) CONTINUOUS APPLICATION EXECUTION BETWEEN MULTIPLE DEVICES

(75) Inventor: Michael K. Chan, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,770

(22) Filed: Sep. 30, 2011

(65) Prior Publication Data

US 2012/0096076 A1  Apr. 19, 2012

Related U.S. Application Data

(63) Continuation of application No. 12/903,972, filed on Oct. 13, 2010.

(51) Int. Cl.
*G06F 15/173* (2006.01)

(52) U.S. Cl. .................................. 709/217; 709/227

(58) Field of Classification Search ............... 709/227, 709/217
See application file for complete search history.

(56) References Cited

U.S. PATENT DOCUMENTS

| 6,044,475 | A | 3/2000 | Chung et al. | |
|---|---|---|---|---|
| 7,526,559 | B1 * | 4/2009 | Phillips | 709/227 |
| 7,676,583 | B2 * | 3/2010 | Eaton et al. | 709/227 |
| 8,166,176 | B2 * | 4/2012 | Kumar et al. | 709/227 |
| 2007/0054627 | A1 * | 3/2007 | Wormald | 455/70 |
| 2009/0063690 | A1 * | 3/2009 | Verthein et al. | 709/228 |
| 2009/0204966 | A1 | 8/2009 | Johnson et al. | |

FOREIGN PATENT DOCUMENTS

| EP | 1 760 584 A1 | 3/2007 |
|---|---|---|
| WO | 02 091179 A2 | 11/2002 |

OTHER PUBLICATIONS

Pastefire app, Desktop-to-iPhone smart copy/paste for everyone, accessed Sep. 9, 2010, 2 pp. http://pastefire.com/.
Pastefire: The Quickest Way to Get Stuff From the Web to Your iPhone, TechCrunch, Jan. 15, 2010, 3 pp. http://techcrunch.com/2010/01/15/pastefire/.
U.S. Appl. No. 12/903,972, by Michael Chan, filed Oct. 13, 2010.
International Search Report and Written Opinion of the International Search Authority, for corresponding International Application No. PCT/US2011/055137, dated Dec. 16, 2011, (10 pages).

* cited by examiner

*Primary Examiner* — Kevin Bates
(74) *Attorney, Agent, or Firm* — Shumaker & Sieffert, P.A.

(57) ABSTRACT

In one example, a device includes a display, an interface configured to exchange data with external devices, a control unit configured to execute an application to cause the display to display a current visual representation of the application, determine a current application state of the application, wherein the current application state includes at least a portion of the current visual representation of the application, and means for sending, without user intervention, an indication of the determined current application state from the device to a second, different device via the interface, wherein the indication of the determined current application state comprises information for recreating at least the portion of the current visual representation of the application, wherein the control unit is configured to prevent subsequent indications of the current application state from being sent to the second device in response to an indication that a third device is executing the application.

19 Claims, 7 Drawing Sheets

CONTINUOUS APPLICATION EXECUTION BETWEEN MULTIPLE DEVICES

This application is a continuation of U.S. application Ser. No. 12/903,972, filed Oct. 13, 2010, the entire contents of which are incorporated herein by reference.

TECHNICAL FIELD

This disclosure relates to computing devices, such as personal computers, tablet computers, laptops, and cellular telephones.

BACKGROUND

Various computing devices are capable of receiving and executing applications. Mobile devices, for example, such as tablet computers and smart phones, are becoming increasingly popular, due in part to the ability to extend the functionality of such mobile devices through the ability to download and execute applications. Some of the applications are similar to applications that can be executed by other computing devices, such as personal computers, workstations, or other such computing devices.

SUMMARY

In one example, a computer-readable storage medium includes instructions that, when executed, cause a processor of a computing device to execute an application at the first client device, determine a current application state of the application, wherein the current application state includes at least a portion of a current visual representation of the application, send, from the first client device to a server device, an indication of the determined current application state, wherein the indication of the determined current application state comprises information for recreating at least the portion of the current visual representation of the application, and, in response to receiving an indication that a different client device is attempting to transmit indications of another application state to the server device, cause the first client device to stop transmission of subsequent indications of the current application state from being sent to the server device to prevent collisions between application state updates from the first client device and application state updates from the different client device.

In another example, a client device includes a display, an interface configured to exchange data with external devices, a control unit configured to execute an application to cause the display to display a current visual representation of the application, determine a current application state of the application, wherein the current application state includes at least a portion of the current visual representation of the application, and means for sending an indication of the determined current application state from the device to a server device via the interface, wherein the indication of the determined current application state comprises information for recreating at least the portion of the current visual representation of the application. The control unit is configured to stop transmission of subsequent indications of the current application state from being sent to the server device, in response to an indication that a different client device is attempting to transmit indications of another application state to the server device, to prevent collisions between application state updates from the first client device and application state updates from the different client device.

In another example, a computer-readable storage medium includes instructions that, when executed, cause a processor of a first client device to execute an application at the first client device, determine a current application state of the application, wherein the current application state includes information for recreating at least a portion of a current visual representation of the application, and send an indication of the determined current application state from the computing device to a second, different client device, to cause the second, different client device to resume execution of the application at the current application state by recreating at least the portion of the current visual representation of the application as executed by the computing device.

In another example, a server device includes one or more external device interfaces configured to receive indications of application states from two or more client devices and to provide the indications of the application states to the two or more client devices, wherein the indications of the application states comprise information for recreating at least portions of current visual representations of applications corresponding to the application states, and a control unit configured to associate the two or more client devices as a group, to receive an indication of an application state from a first client device of the group, to determine that a second, different client device of the group has begun executing the application corresponding to the received indication of the application state from the first client device, and to provide the indication of the application state to the second client device in response to the determination that the second client device has begun executing the application.

In another example, a method includes receiving, by a server device, an indication of an application state from a first client device of a group of two or more associated client devices, wherein the indication of the application state comprises information for recreating at least a portion of a current visual representation of an application executed by the first client device, determining that a second, different client device of the group of two or more associated client devices has begun executing the application corresponding to the indication of the application state received from the first client device, and providing, by the server device, the indication of the application state received from the first client device to the second client device in response to determining that the second client device has begun executing the application.

The techniques of this disclosure may provide one or more advantages. For example, the techniques of this disclosure may permit a user to continue execution of an application between two or more devices. That is, the user may first execute the application with a first device, then switch to a second device and continue execution of the application using the second device from a state of the application as executed by the first device. In this manner, the user may avoid loss of continuity within the application, e.g., avoiding loss of the user's position while reading a web page, e-mail document or other textual document, playing a multimedia file such as a song or video, playing a game, or otherwise using an application that can be executed by more than one device.

The details of one or more examples are set forth in the accompanying drawings and the description below. Other features, objects, and advantages will be apparent from the description and drawings, and from the claims.

DETAILED DESCRIPTION

Figure 1A:
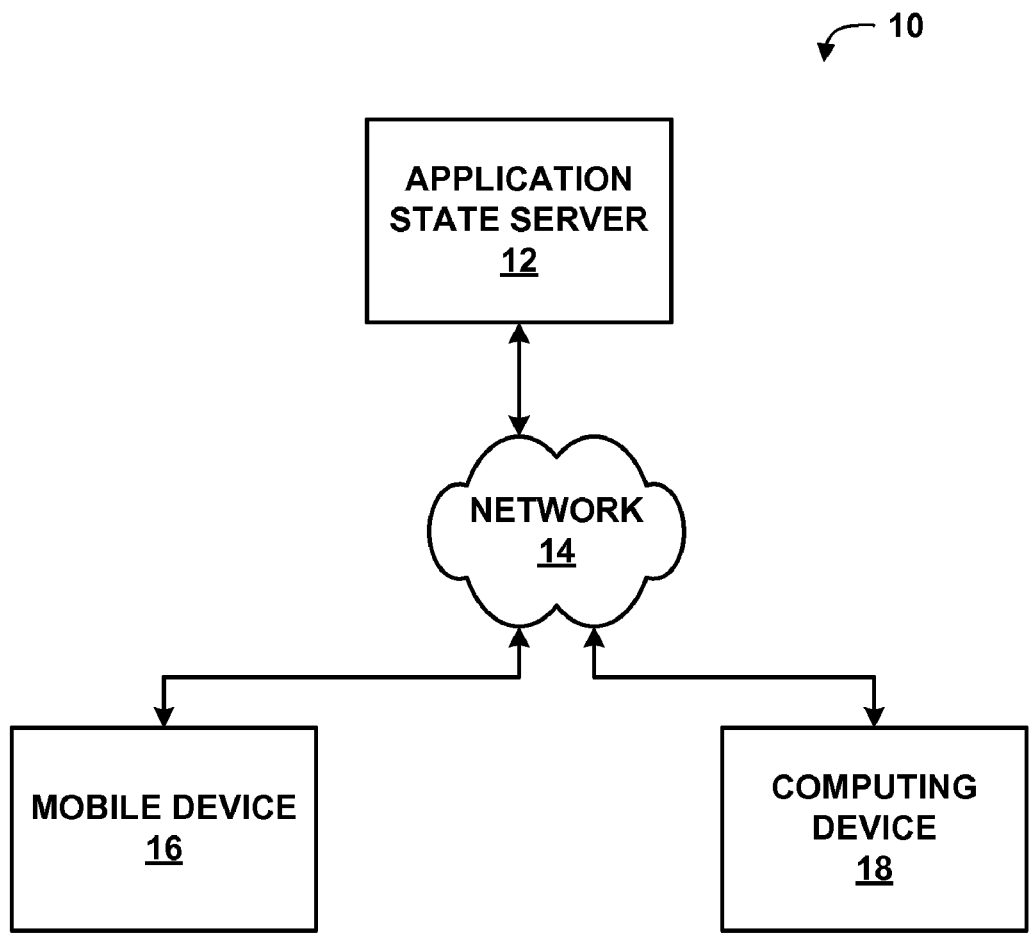
FIG. 1A is a block diagram illustrating an example system in which a mobile device and a computing device may provide and/or receive indications of application states for various applications via an application state server.

In general, this disclosure is directed to techniques for allowing a user to switch between two or more devices, such as between a mobile device (e.g., a cellular telephone) and a computing device, such that applications in use on one device can be resumed on another device without the user losing his or her place in the applications. For example, if the user is viewing a particular web page on a mobile device, then begins using a computing device and executes a web browser, the mobile device may provide an indication of the uniform resource locator (URL) of the web page and a current portion of the web page (e.g., a current paragraph) displayed by the mobile device to the computing device. The computing device may receive the indication of the current web page and current portion of the web page being displayed by the mobile device, then automatically (that is, without user intervention) display the web page and automatically scroll to the portion of the web page that was being displayed by the mobile device.

The mobile device may periodically save application state for active applications and upload the application state to an external device, referred to in this disclosure as an application state server. In some examples, the application state server may be the same device as the computing device that resumes the applications. That is, in some examples, the computing device may implement the functionality of the application state server. In some examples, the application state server may be a separate device in communication with both the mobile device and the computing device. In either case, the mobile device may periodically send indications of the current application state of one or more active applications to the application state server.

The mobile device may receive an indication from the application state server that another device has begun executing the application. In response to receiving the indication that another device is executing the application, the mobile device may prevent subsequent indications of the current application state from being sent from the mobile device to the application state server. For example, the mobile device may receive an indication that the computing device has begun execution of the application, e.g., from the application state server and/or the computing device, and in response, inhibit future application state updates for the application. As another example, the mobile device may receive an indication from the user that the user is no longer using the mobile device to execute the application. The mobile device may then inhibit sending future indications of the current application state of the application to the application state server.

In addition, the application state server may provide an indication of the current (e.g., most recent) application state to the computing device that has begun executing the application. The computing device may use the indication of the application state to resume execution of the application at the point where the mobile device made the last application state update. In this manner, the user may experience a relatively seamless transition of application execution when moving between two devices that are both capable of executing the same application, e.g., a web browser, an e-mail application, a multimedia application such as movie player or music player, gaming applications, or other applications.

FIG. 1A is a block diagram illustrating an example system 10 in which mobile device 16 and computing device 18 may provide and/or receive indications of application states for various applications. In particular, in the example of FIG. 1A, mobile device 16 and computing device 18 may be configured to provide application state updates to application state server 12 via network 14. For example, while a user is interacting with an application executed by mobile device 16, mobile device 16 may periodically provide application state updates to application state server 12. Later, the user may switch to computing device 18 to execute the application, and computing device 18 may retrieve the most recent application state from application state server 12, such that computing device 18 may resume execution of the application from the most recent application state update. Similarly, computing device 18 may be configured to provide application state updates to application state server 12 while executing applications that may also be executed by mobile device 16.

In this manner, system 10 may provide a continuous application experience for a user when moving between devices, such as between mobile device 16 and computing device 18. Although primarily described with respect to one application for purposes of example, it should be understood that the techniques of this disclosure may be applied to any number of applications executed by mobile device 16 and then subsequently executed by computing device 18. Moreover, although again described for purposes of example with respect to a mobile device and a computing device, it should be understood that the techniques of this disclosure may apply to any two or more devices capable of executing the same or similar applications. For example, the devices of system 10 may correspond to two or more stationary computing devices, two or more mobile devices, or any combination of stationary and/or mobile devices. Any of the two or more devices may correspond to, for example, a personal computer, a workstation computer, a laptop computer, a tablet computer, a cellular telephone, a smartphone, a personal digital assistant, or any other device capable of executing applications.

The techniques of this disclosure may apply to a variety of different applications. In general, these techniques may apply to applications that may be executed by mobile device 16 and computing device 18. For example, the techniques may apply to web browsers, e-mail readers, document readers, multimedia players such as video and music players, games, or other applications. In general, the applications executed by mobile device 16 may differ from applications executed by computing device 18, but may be the same types of applications, e.g., be applications used for the same purposes. Thus, references to an application executed by both mobile device 16 and computing device 18 (or any other two devices) should be understood to include distinct applications executed by mobile device 16 and computing device 18, but that are executed for the same purpose. For example, a web browser executed by mobile device 16 may differ from a web browser executed by computing device 18, but may still be considered the same application in that both of the web browsers are expected to implement hypertext transfer protocol (HTTP), be capable of retrieving and rendering Internet web sites, and the like.

The state updates provided to application state server 12 may be specific to an application that can be executed by two or more devices, e.g., mobile device 16 and computing device 18. As one example, mobile device 16 and computing device 18 may each execute respective web browsers. For example, a user may interact with a web browser of mobile device 16 to view a web page at a particular uniform resource locator (URL). In accordance with the techniques of this disclosure, mobile device 16 may periodically provide application state updates to application state server 12. The application state updates, with respect to the example of a web browser, may include, for example, an indication of the URL of a web page currently being viewed with the web browser of mobile device 12. In some examples, the web browser may be capable of viewing a plurality of URLs, e.g., by opening multiple windows or tabs for the web browser. Accordingly, the application state updates may include a plurality of URLs.

Furthermore, an indicator of an application state may include information for recreating at least a portion of current visual representation of an application. With respect to the example of a web browser, for example, the current visual representation may correspond to a current paragraph, word, sentence, line number, hypertext markup language (HTML) anchor tag, picture, section, link, or other indication of a current portion of the web page being displayed by the web browser. In this manner, when the user switches to computing device 18 after using mobile device 16, computing device 18 may display substantially the same information as was previously displayed by mobile device 16. For example, computing device 18 may automatically scroll to a portion of the web page that was displayed by mobile device 16 before the user switched from mobile device 16 to computing device 18.

As another example, mobile device 16 and computing device 18 may each be configured to execute respective e-mail applications. In such an example, the indication of the application state may describe a particular e-mail currently displayed by the e-mail application and the current paragraph, line, sentence, or other representation of the position within the e-mail when the user switched from mobile device 16 to computing device 18. Thus mobile device 16 may generate an indication of an application state indicative of the current e-mail displayed by mobile device 16 and a position within the e-mail currently being displayed for an application state update.

As another example, the application may correspond to a multimedia player, such as a music or movie player. In this example, the application state may describe a current song or video being played, as well as a current temporal location within the song or video. The current temporal location may define the temporal location within the multimedia data that was being played when the application state was determined. Thus, the current visual representation may correspond to a status bar that visually represents the current temporal location of the song or video being played. Mobile device 16 may generate an indication of an application state indicative of the current song or video being played by mobile device 16, as well as a temporal location within the song/video, for an application state update. In some examples, mobile device 16 may also transfer the song or video to application state server 12 or directly to computing device 18, assuming that such transfer is permitted by applicable copyright laws and regulations.

Figure 1B:
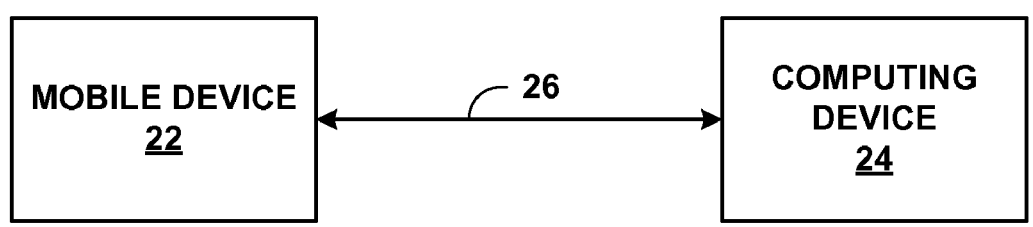
FIG. 1B is a block diagram illustrating another example system including a mobile device and a computing device.

FIG. 1B is a block diagram illustrating another example system 20 including mobile device 22 and computing device 24. In this example, rather than sending indications of application state to a server, as in FIG. 1A, mobile device 22 may send indications of application state directly to computing device 24. That is, a user may execute an application using mobile device 22 for a period of time. The user may then begin executing the application on computing device 24.

Computing device 24 may send an indication to mobile device 22 that computing device 24 has begun executing the application and request a current application state for the application as executed by mobile device 22. After receiving the indication of the current application state from mobile device 22, computing device 24 may resume execution of the application at the current application state as received from mobile device 22.

Mobile device 22 and computing device 24 establish connection 26 that communicatively couples mobile device 22 and computing device 24. Mobile device 22 may be communicatively coupled to computing device 24 in a variety of ways. For example, computing device 24 may include a universal serial bus (USB) port that allows mobile device 22 to be coupled to computing device 24 by a USB cable, such as a micro-USB cable. The USB cable may be used to charge a battery of mobile device 22 in addition to allowing mobile device 22 to communicate with computing device 24. As another example, mobile device 22 may be wirelessly coupled to a wireless switch or wireless router (not shown) of a network to which computing device 24 is also coupled.

After establishing connection 26, mobile device 22 may send an indication of application state to computing device 24 in a variety of ways. In one example, mobile device 22 may automatically send indications of one or more application states to computing device 24. That is, mobile device 22 may push application state information to computing device 24. In another example, computing device 24 may request application state information from mobile device 22 when computing device 24 is coupled to mobile device 22 via connection 26 and when a user executes an application that is also installed (or for which a similar application is installed) on mobile device 22. That is, computing device 24 may pull application state information from mobile device 22. In some examples, mobile device 22 and computing device 24 may be configured to push and pull data, respectively.

In some examples, mobile device 22 and computing device 24 may be configured to execute respective applications to cause mobile device 22 to send application state information to computing device 24. For example, the application executed by computing device 24 may recognize when mobile device 22 establishes connection 26 with computing device 24, and in response, request application state information from mobile device 22 for one or more applications capable of being executed by both computing device 24 and mobile device 22. As another example, the application executed by mobile device 22 may recognize when connection 26 is established and, in response, send application state information to computing device 24. Mobile device 22 may stop executing the application (e.g., may stop playing a song or video) upon sending the application state to device 24.

When the techniques of this disclosure are implemented as applications that allow application state information to be exchanged, the applications that cause application state information exchange between mobile device 22 and computing device 24 may provide configuration settings that allow a user to configure the exchange of application state information. For example, the user may be provided with options to make the exchange of application state information automatic, present an indication that another device has requested application state information and send the application state information only when the user responds affirmatively to allow the device to send the application state information, or to completely disable application state information exchange for one or more (or all) applications. In this manner, the user may enable or disable the exchange of application state information between two devices, such as mobile device 22 and computing device 24, at any time. Users may be provided with similar configuration options in example system 10 of FIG. 1A.

Although for purposes of example, FIG. 1B is described as mobile device 22 providing application update information to computing device 24, it should be understood that computing device 24 may similarly provide application update information to mobile device 22. In this manner, a user may first use computing device 24 to execute an application, and then subsequently desire to continue execution of the application on mobile device 22. Accordingly, computing device 24 may determine a current application state for the application and send the current application state to mobile device 22. The user may then resume execution of the application on mobile device 22. Furthermore, the techniques described with respect to FIG. 1B may be implemented with two or more similar devices, e.g., two or more mobile devices, two or more stationary computing devices, or any combination of mobile and stationary devices.

Moreover, the techniques described with respect to FIGS. 1A and 1B may be combined, in some examples. That is, in some examples, a mobile device may be configured to provide application state updates to an application state server and/or to a computing device, based on various configuration data. For example, for a first application, the mobile device may be configured to provide application state information directly to a computing device, while for another application, the mobile device may be configured to provide application state information to an application state server, such as application state server 12 of FIG. 1A.

Figure 2:
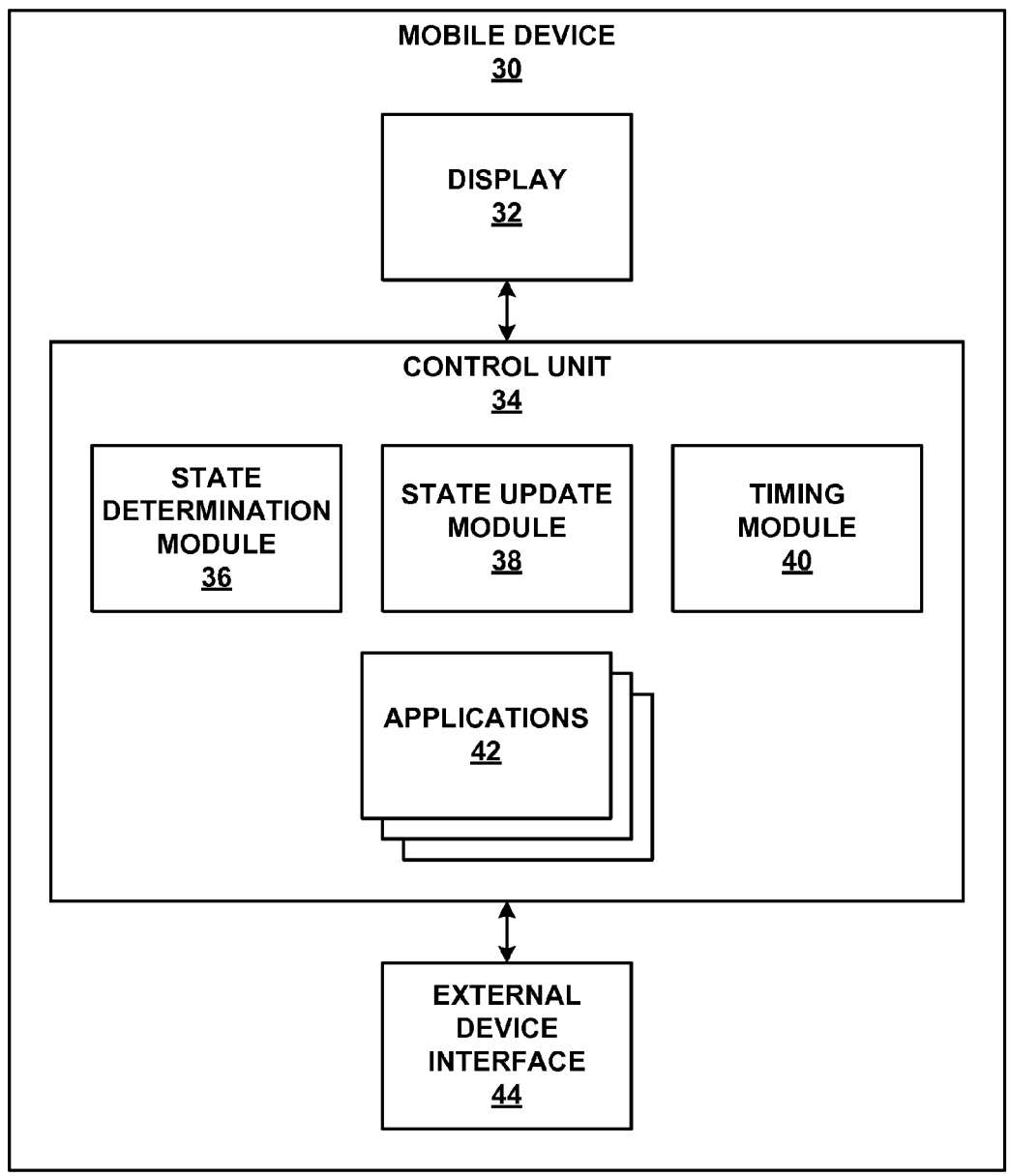
FIG. 2 is a block diagram illustrating an example mobile device that provides application state information to an external device, such as an application state server or a remote computing device.

FIG. 2 is a block diagram illustrating an example mobile device 30 that provides application state information to an external device, such as an application state server or a remote computing device. In the example of FIG. 2, mobile device 30 includes display 32, control unit 34, and external device interface 44. Control unit 34 includes state determination module 36, state update module 38, timing module 40, and one or more applications 42. Mobile device 30 may correspond to mobile device 16 (FIG. 1A) or mobile device 22 (FIG. 1B), and in some examples, may include functionality similar to both mobile device 16 and mobile device 22.

Display 32 may correspond to a liquid crystal display (LCD) screen, a touchscreen display, or other display capable of presenting text and/or images to a user. Display 32 may form at least part of a user interface of mobile device 30. When corresponding to a touchscreen, display 32 may additionally receive input from a user via the touchscreen, e.g., when a user selects a region of the touchscreen. External device interface 44 may correspond to an interface for communicating with an external device. External device interface 44 may correspond to a mini- or micro-USB port, a network interface card, a wireless network interface such as an interface for connecting to a wireless local area network (WLAN) or a Third Generation Partnership Project (3GPP) network, or other interface. In some examples, mobile device 30 may include more than one external device interface for communication with external devices in various ways.

Control unit 34 may include one or more processors or processing units such as, for example, microprocessors, application-specific integrated circuits (ASICs), digital signal processors (DSPs), field programmable gate arrays (FPGAs), or other processing units. Control unit 34 may further include a computer-readable storage medium, such as flash memory, that may store instructions for, e.g., state determination module 36, state update module 38, timing module 40, and applications 42. Accordingly, the one or more processing units may execute the instructions to perform the functions attributed to state determination module 36, state update module 38, timing module 40, and applications 42. In some examples, any or all of state determination module 36, state update module 38, timing module 40, and applications 42 may correspond to individual hardware units. Any or all of state determination module 36, state update module 38, timing module 40, and applications 42 may be functionally integrated and/or separated into further modules or units.

Applications 42 may include one or more applications executable by control unit 34 and that can also be executed (or for which functional analogs can be executed) by another device. For example, applications 42 may include one or more of a web browser, an e-mail client, a game, a document reader, a spreadsheet program, a text editor, a multimedia player such as a video and/or music player, or other applications. As stated above, instructions for any or all of applications 42 may be stored in a computer-readable storage medium of control unit 34. The instructions may be executed by one or more processors or processing units of control unit 34.

State determination module 36 may be configured to determine an application state of one or more of applications 42 while applications 42 are executed by control unit 34. Execution of applications 42 generally includes receiving input from, e.g., a user, in response to which applications 42 generate output, e.g., a visual display. A current application state may generally correspond to information regarding execution of one of applications 42 that is sufficient for causing the same or a different device executing the application to present at least a portion of the visual display without receiving the same user input.

As an example, with respect to a web browser application, the web browser may receive input in the form of a uniform resource locator (URL) of a desired web page from a user. In addition, the web browser may receive user input in the form of scrolling to a particular portion of the web page. An example application state for a web browser may include the URL and, in some examples, a portion of the web page corresponding to the URL that is currently being displayed as a result of a sequence of scrolls or other movements as input by a user. That is, state determination module 36 may determine the URL and current position of the web page corresponding to the URL being displayed by display 32 and construct an application state that includes representations of the URL and position of the web page. Thus, another device executing a web browser may receive the application state from mobile device 30 via external device interface 44 and direct the web browser to the URL, then automatically scroll to the portion of the web page that was being displayed by mobile device 30, based on the application state information received from mobile device 30.

As another example, with respect to an e-mail client application, the e-mail client may receive input in the form of a selected e-mail document. In addition, the e-mail client may receive user input in the form of scrolling to a particular portion of the e-mail document. State determination module 36 may determine the current e-mail document being displayed by display 32 while control unit 34 executes the e-mail client, and in some examples, the current portion of the e-mail document being displayed, and construct application state information representative of the current e-mail document and the current portion of the e-mail document being displayed. Thus, another device executing an e-mail client may, assuming the other device has access to the user's e-mail server, receive the application state from mobile device 30 via external device interface 44 and cause the e-mail client to display the same e-mail document, then automatically scroll to the portion of the 3-mail document that was being displayed by mobile device 30, based on the application state information received from mobile device 30.

In other examples, application state may include other information based on the particular application being executed by control unit 34. For example, gaming applications executed by control unit 34 may have application state that indicates pieces that remain on a playing board, cards that remain in a deck and their order in the deck, tiles that remain in play and their positions (e.g., for mahjong), scores, timing information, or other data for recreating at least a portion of a visual representation of the game. As another example, a document reader may have application state that indicates an open document and a portion of the document currently being displayed. As yet another example, a multimedia application, such as a video or audio player, may have application state that indicates a song or video being played and a current time for the song or video being played. In the example of a multimedia application, the portion of the visual representation may correspond to a horizontal scroll bar that corresponds to the current temporal position of the song or video.

In some examples, e.g., as shown in FIG. 1B, state determination module 36 may determine a current application state for one or more of applications 42 executed by control unit 34 upon request from an external device. In other examples, state determination module 36 may periodically determine a current application state for one or more of applications 42 as executed by control unit 34, e.g., in response to requests from state update module 38. State update module 38 may be configured to periodically request a current application state for applications 42 and to provide updates for the applications to an external application state server, e.g., as shown in FIG. 1A. In such examples, state update module 38 may be configured to periodically provide state updates for one or more of applications 42 to the application state server.

State update module 38 may receive indications of current application state for one or more of applications 42 from state determination module 36. State update module 38 may then provide the application state information to the application state server. State update module 38 may further provide contextual information for the state updates, such as a unique identifier for mobile device 30 that uniquely identifies mobile device 30 to the application state server. State update module 38 may interact with timing module 40 to determine a time at which to provide state updates to the application state server. For example, state update module 38 may be configured to provide an application state update to an application state server in incremental time periods, e.g., every X minutes or hours. Accordingly, when timing module 40 indicates that the time period has expired, state update module 38 may retrieve a current application state from state determination module 36 and send the current application state to the application state server.

In response to an indication from an external device that another computing device has begun executing the application, e.g., a message from an application state server or the computing device itself, state update module 38 may inhibit future application state updates. For example, state update module 38 may disable timing module 40, set an update status flag to false (where state update module 38 may check the update status flag to determine whether to send an application state update to an application state server when timing module 40 expires), stop executing the application, or otherwise prevent future application state updates from being sent from mobile device 30. State update module 38 may resume sending application state updates in response to an indication that the external computing device is no longer executing the application.

In some examples, mobile device 30 may receive input from a user that indicates that the user no longer wishes for mobile device 30 to provide application state updates to the application state server. In some examples, mobile device 30 may simply receive an indication to stop sending application state updates, which the sending device may generate and send to mobile device 30 in response to determining that the computing device has begun executing one or more applications that were being executed by mobile device 30. In any case, state update module 38 may generally inhibit application state updates when another device, associated with mobile device 30, has begun executing an application for which state update module 38 was generating application state updates.

Although described with respect to the example of a mobile device, other devices may include similar components to those of mobile device 30. For example, laptop computers, tablet computers, personal computers, workstation computers, or other such computing devices may include components similar to those described with respect to mobile device 30.

Figure 3:
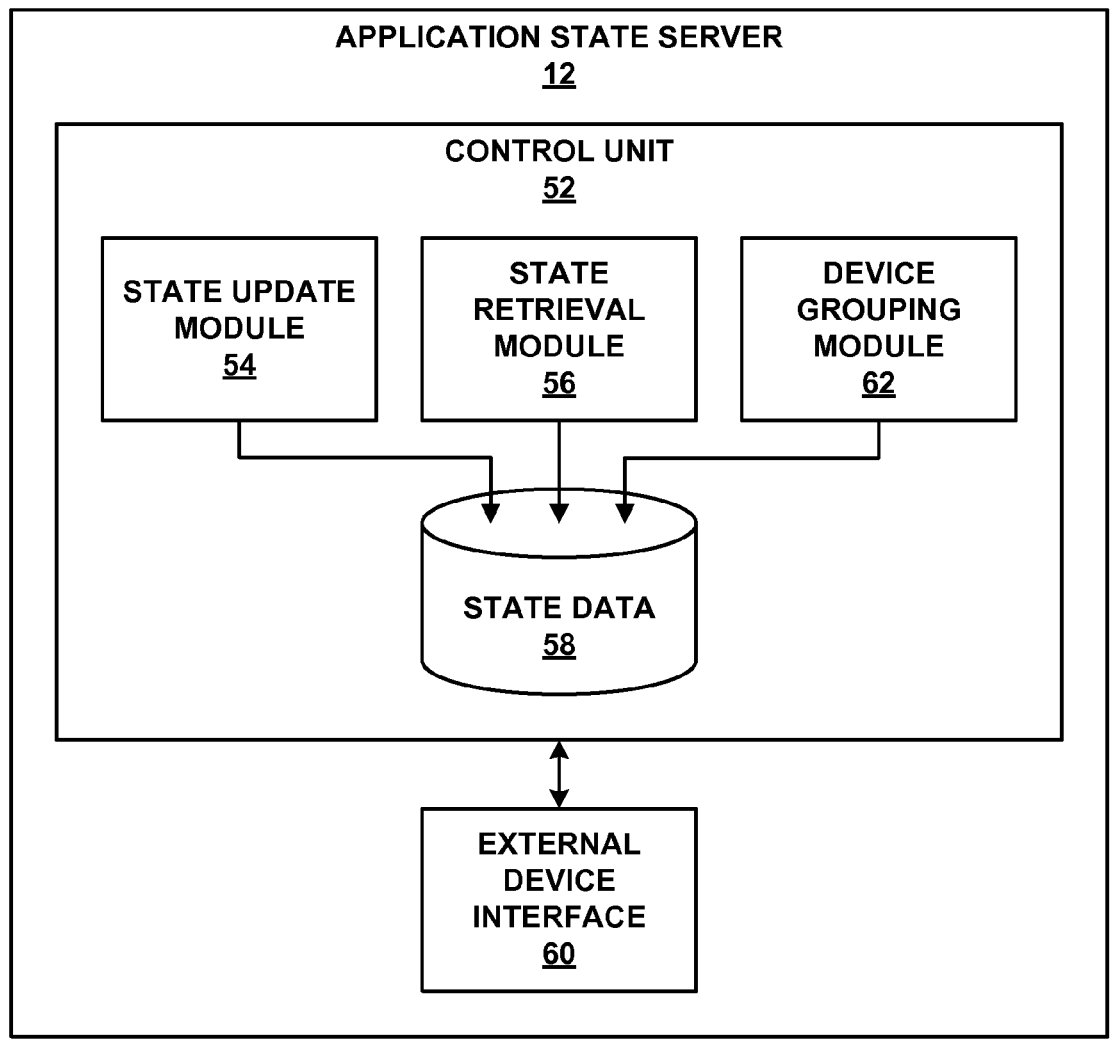
FIG. 3 is a block diagram illustrating an example arrangement of components of an application state server.

FIG. 3 is a block diagram illustrating an example arrangement of components of application state server 12. In the example of FIG. 3, application state server 12 includes control unit 52 and external device interface 60. External device interface 44 may correspond to an interface for communicating with an external device. External device interface 44 may correspond to a USB port, a network interface card, a wireless network interface such as an interface for connecting to a wireless local area network (WLAN), or other interface. In some examples, application state server 12 may include more than one external device interface for communication with external devices in various ways.

In the example of FIG. 3, control unit 52 includes state update module 54, state retrieval module 56, state date 58, and device grouping module 62. Control unit 52 may include one or more processors or processing units such as, for example, microprocessors, ASICs, DSPs, FPGAs, or other processing units. Control unit 52 may further include a computer-readable storage medium, such as flash memory, that may store instructions for, e.g., state update module 54, state retrieval module 56, and device grouping module 62. Accordingly, the one or more processing units may execute the instructions to perform the functions attributed to state update module 54, state retrieval module 56, and device grouping module 62. In some examples, any or all of state update module 54, state retrieval module 56, and device grouping module 62 may correspond to individual hardware units. Any or all of state update module 54, state retrieval module 56, and device grouping module 62 may be functionally integrated and/or separated into further modules or units.

State data 58 may correspond to a database comprising application states for applications executed by a variety of different devices. In other examples, state data 58 may be organized as a flat file, one or more data structures, or other organizational schemes. In general, state data 58 stores a current application state for an application capable of being executed by any of a number of associated devices. As an example, a group of devices may include a user's personal computer and the user's cellular telephone. State data 58 may store a current application state for an application (e.g., a web browser, an e-mail client, a game, a multimedia application, etc.) as executed by one of the devices in the group such that other devices in the group may retrieve the application state and resume execution of the application, e.g., when a user switches to one of the other devices in the group and begins executing the application.

State data 58 may store current application states for a number of applications associated with a group of devices. Moreover, state data 58 may store current application state for a number of groups of devices. Device grouping module 62 may associate devices to form a group. An administrator or other user may provide information for associating devices together to form a group. For example, while using a device to be added to a group, a user may provide login credentials (e.g., a username and password) to application state server 12 and indicate that the device being used to should be added to a group associated with the user's login credentials. A user may create multiple groups. Each group may be associated with one or more applications capable of being executed by any of the devices of the group. Device grouping module 62 may store associations between devices within state data 58.

State update module 54 may receive application state updates via external device interface 60 from a device of a group. Upon receiving an application state update, state update module 54 may query state data 58 to determine a group including the device from which the application state update was received. State update module 54 may then store the current application state for the corresponding application within state data 58 in association with the group including the device from which the update was received.

State retrieval module 56 may receive a request for a current application state for a particular application from a device of a particular group. In response, state retrieval module 56 may query state data 58 for the application and for the group including the requesting device to retrieve the current application state and provide the current application state to the device that sent the request, via external device interface 60. Moreover, state retrieval module 56 may generate and send a message to a device of the group that sent the current state update to application state server 12 via external device interface 60 to cause the device to stop sending application state updates.

In some examples, control unit 52 may implement a token passing scheme in which only one device of a group may be given a "token." The device with the token may be granted the right to send application state updates. Accordingly, state update module 54 may, upon receipt of an application state update, determine whether the device providing the update has the token (e.g., whether the device is permitted to provide application state updates) and update the current application state only when the device has the token (or is otherwise permitted to update the current application state). Devices of a group other than the device granted the token may request the token, in which case the token may be removed from the current device and passed to the requesting device. In general, the device with the token may correspond to the device currently being used by a user to execute a particular application.

Figure 4:
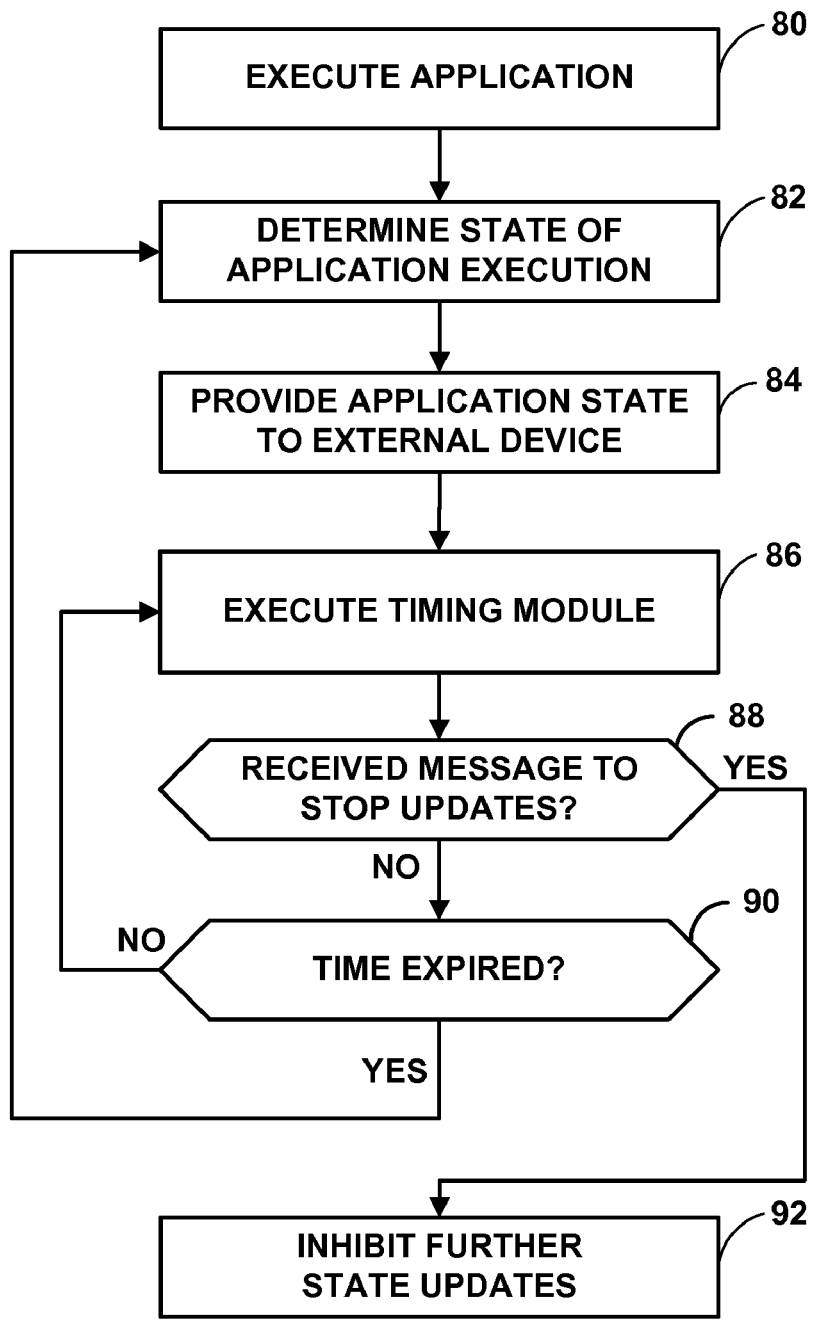
FIG. 4 is a flowchart illustrating an example method for providing periodic application state updates to an application state server.

FIG. 4 is a flowchart illustrating an example method for providing periodic application state updates to an application state server. Although described for purposes of example with respect to mobile device 30 (FIG. 2), it should be understood that any suitable device may be used to implement and execute the example method of FIG. 4.

Initially, mobile device 30 may begin executing an application (80). For example, control unit 34 may begin executing one of applications 42. Control unit 34 may, for example, receive a selection of one of applications 42 to begin executing from a user. For example, the user may interact with a touchscreen of mobile device 30 to select an icon corresponding to the application, and control unit 34 may receive an indication that the icon has been selected, and in turn, retrieve and begin executing instructions for the application.

State determination module 36 may then determine a current application state for the executed application (82). For example, for a web browser application, state determination module 36 may determine a current web page URL and a position of the web page being displayed. As another example, for an e-mail application, state determination module 36 may determine a current e-mail document being read and a position of the e-mail document being displayed. As another example, for a gaming application, state determination module 36 may determine a current state of the game, e.g., cards in a deck and their order and cards in play and their positions (e.g., for a solitaire game), positions of tiles on a field of play (e.g., for mahjong), or other positions and presence/absence of game pieces. As yet another example, for multimedia applications, state determination module 36 may determine a current multimedia file (e.g., song or video) being played by the multimedia application as well as a current temporal location within the multimedia data being played.

State update module 38 may then provide an application state update to an application state server, such as application state server 12 (FIG. 1A) (84). In some examples, state update module 38 may provide the application state update directly to a device that is able to execute the application being executed by control unit 34. After providing the application state update, in the example of FIG. 4, state update module 38 may execute timing module 40 (86), e.g., to wait a predetermined amount of time before providing a subsequent application state update.

While awaiting an indication that the predetermined amount of time has expired (90), state update module 38 may check for an indication (e.g., a message or signal) to stop providing application state updates (88). If no such message has been received ("NO" branch of 88), control unit 34 may continue executing timing module 40 (86). If the predetermined amount of time since the previous application state update has expired ("YES" branch of 90), state determination module 36 may again determine a current application state for the application being executed (82), state update module 38 may provide an application state update to, e.g., the application state server (84), and then re-initialize timing module 40 (86). If the predetermined amount of time has not yet expired ("NO" branch of 90), state update module 38 may continue executing timing module 40 (86).

On the other hand, if state update module 38 has received a message to stop sending application state updates ("YES" branch of 88), state update module 38 may inhibit sending future state updates (92). In some examples, control unit 34 may stop executing the application. Control unit 34 may alternatively continue to execute the application without sending application state updates.

The method of FIG. 4 may be summarized as executing, by a first device, an application, determining a current application state of the application, wherein the current application state includes at least a portion of a current visual representation of the application, sending, without user intervention, an indication of the determined current application state from the first device to a second, different device, wherein the indication of the determined current application state comprises information for recreating at least the portion of the current visual representation of the application, and, in response to receiving an indication that a third device is executing the application, preventing subsequent indications of the current application state from being sent from the first device to the second device. While described above with respect to the example components of mobile device 30 described with respect to FIG. 2, it should be understood that other devices may perform the method of FIG. 4.

Figure 5:
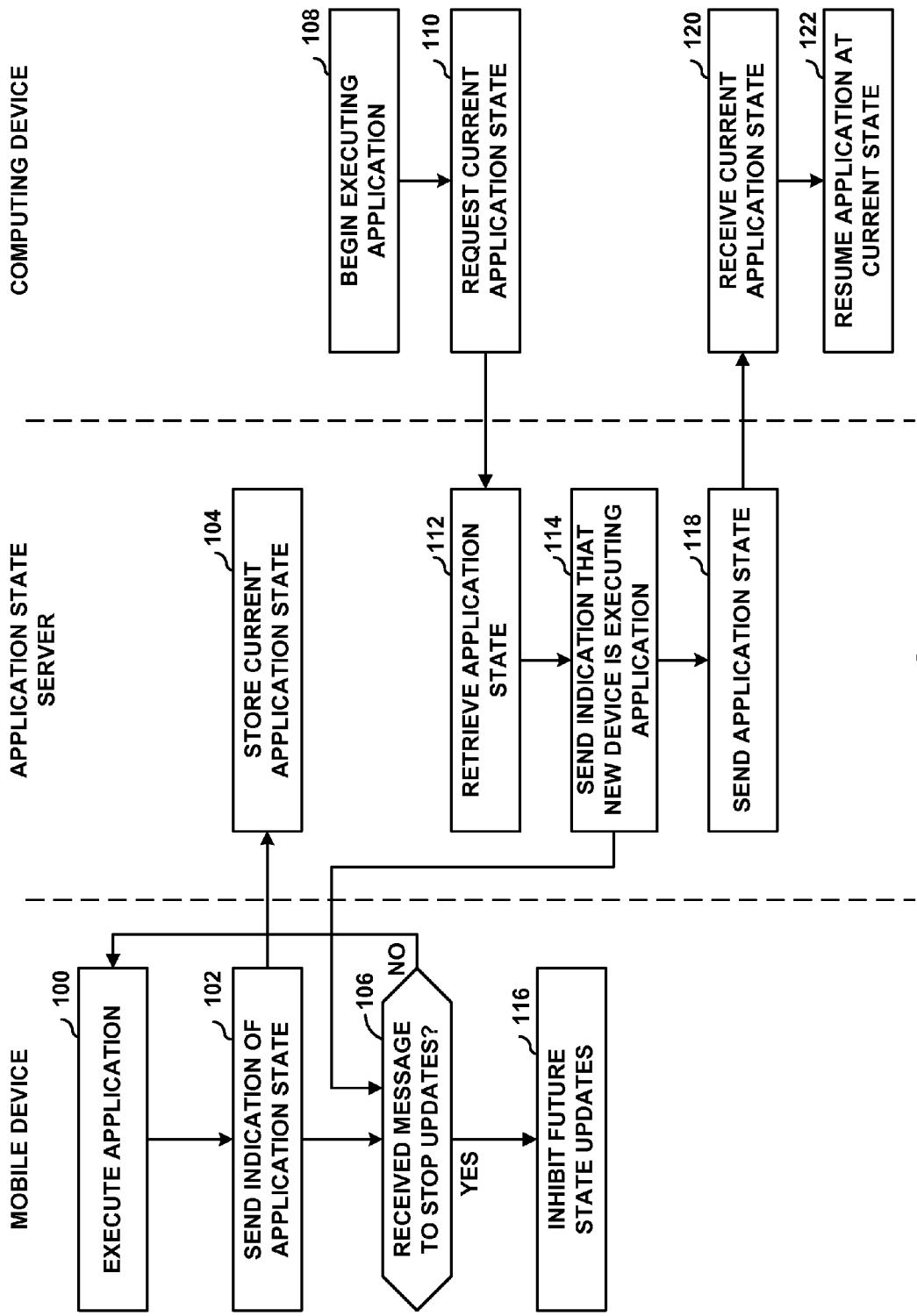
FIG. 5 is a flowchart illustrating an example method for exchanging application state information between a mobile device and a computing device via an application state server.

FIG. 5 is a flowchart illustrating an example method for exchanging application state information between a mobile device and a computing device via an application state server. While described with respect to the examples of a mobile device and a computing device, it should be understood that the method of FIG. 5 may be performed by two or more devices of various types, e.g., two or more mobile devices, two or more stationary computing devices, and/or any combination of mobile and stationary devices. In some examples, the device corresponding to the computing device may additionally perform the functionality attributed to the application state server.

In the example of FIG. 5, a mobile device, e.g., mobile device 16 (FIG. 1A), executes an application (100). While executing the application, mobile device 16 periodically sends application state updates that indicate a current application state to application state server 12 (102), which stores the current application state (104). For example, application state server 12 may determine an identifier for mobile device 16 and store the received application state in a database in association with a group of devices that includes the identifier for mobile device 16.

Mobile device 16 may continue to execute the application (100) and periodically send application state updates to application state server 12 (102) while no message to stop sending the updates has been received ("NO" branch of 106). After computing device 18, for example, begins executing the application (or a similar application) (108), computing device 18 may request a current application state for the application from application state server 12 (110). Assuming, as illustrated in the example, that application state server has stored a current application state for the application, application state server 12 may retrieve the stored application state (112) and send an indication that a new device (in this example, computing device 18) has begun executing the application to mobile device 16 (114). Accordingly, mobile device 16 may inhibit future state updates (116) in response to receiving the indication from application state server 12 ("YES" branch of 106).

Furthermore, application state server 12 may send an indication of the current application state to computing device 18 (118). After receiving the indication of the current application state (120), computing device 18 may resume execution of the application from the point indicated by the received indication of the application state (122). For example, for a web browser application, computing device 18 may retrieve a web page from a URL indicated by the indicator of the current application state, display the web page, and automatically scroll to a position indicated by the indicator of the current application state. For an e-mail client application, as another example, computing device 18 may present the e-mail document of the indicator of the application state and automatically scroll to a position indicated by the application state. For a game application, computing device 18 may recreate the state of the game as indicated by the indicator of the application state. For a multimedia application, computing device 18 may load a multimedia data file (e.g., a song or video) indicated by the current application state and begin playing the multimedia data file from a temporal location indicated by the indicator of the application state.

Figure 6:
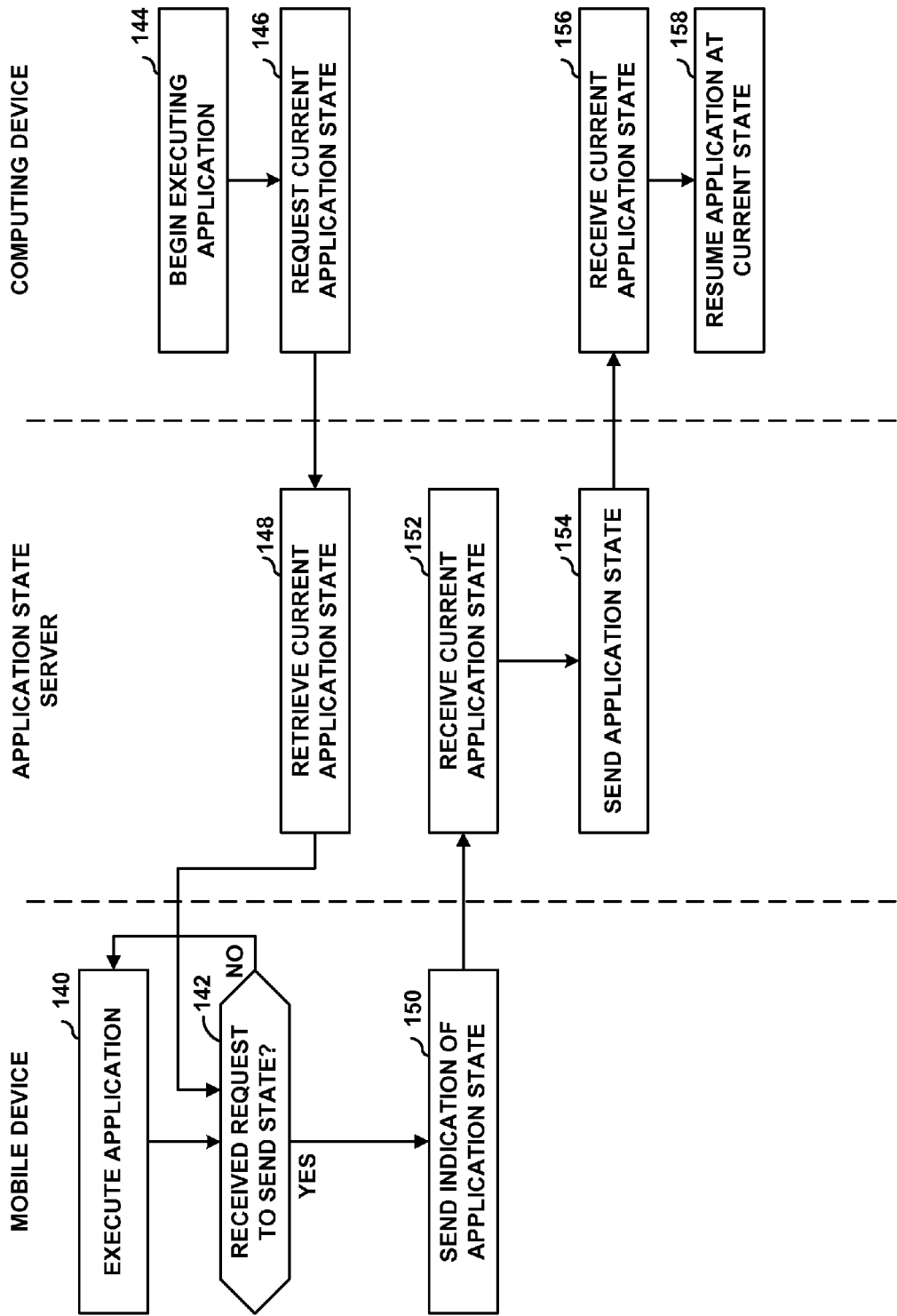
FIG. 6 is a flowchart illustrating another example method for exchanging application state information between a mobile device and a computing device via an application state server.

FIG. 6 is a flowchart illustrating another example method for exchanging application state information between a mobile device and a computing device via an application state server. In the example of FIG. 6, rather than periodically providing indications of application state, mobile device 16 provides an indication of the current application state on demand, e.g., in response to a request from application state server 12. Again, although described with respect to elements of the example of FIG. 1A, it should be understood that the method of FIG. 6 may be performed by any suitable devices, e.g., two or more mobile devices, two or more stationary computing devices, or any combination of mobile and stationary devices.

In the example of FIG. 6, mobile device 16 may execute an application (140) and continue executing the application until receipt of a request to send the current application state from, e.g., application state server 12 (142). At some point during execution of the application, computing device 18 may begin executing the application (144). Accordingly, computing device 18 may request the current application state from application state server 12 (146). In response to the request for the current application state, application state server 12 may determine a device that is associated with computing device 18 that could be executing the application (mobile device 16, in this example). Accordingly, application state server 12 may request the current application state from mobile device 16 (148).

In response to the request for the current application state, mobile device 16 may send an indication of the current application state to application state server 12 (150). Application state server 12 may receive the indication of the current application state (152) and then send the indication of the current application state to computing device 18 (154). After receiving the indication of the current application state (156), computing device 18 may resume execution of the application at the current application state (158).

Figure 7:
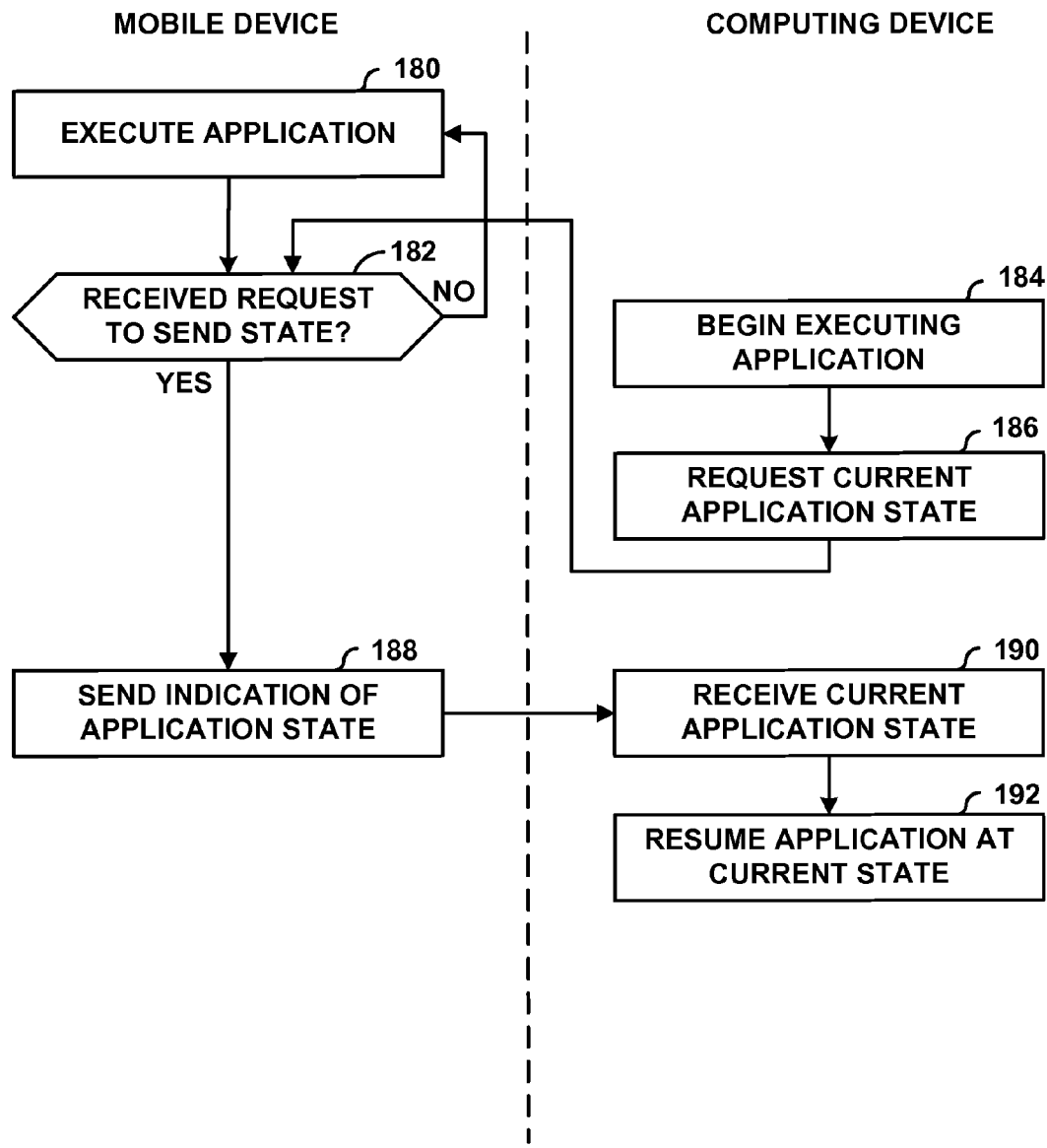
FIG. 7 is a flowchart illustrating another example method for exchanging application state between two devices.

FIG. 7 is a flowchart illustrating another example method for exchanging application state between two devices, e.g., mobile device 22 and computing device 24 (FIG. 1B). In the example method of FIG. 7, mobile device 22 and computing device 24 exchange an indication of current application state without the use of an application state server. While described for purposes of example with respect to mobile device 22 and computing device 24, it should be understood that any two devices may perform the techniques of FIG. 7, e.g., two or more mobile devices, two or more stationary computing devices, or any combination thereof.

In the example of FIG. 7, mobile device 22 executes an application (180) and awaits receipt of a request for a current application state (182). At some point during execution of the application by mobile device 22, computing device 24 may begin execution of the application, or may receive a request to begin execution of the application, e.g., from a user (184). In response, computing device 18 may send a request for an indication of the current application state as executed by mobile device 22 from mobile device 22 (186).

In response to this request, mobile device 22 may send an indication of the current application state to computing device 18 (188). After receiving the indication of the current application state from mobile device 22 (190), computing device 18 may resume execution of the application from the state indicated by the indication of the current application state (192).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media. In this manner, computer-readable storage media should be understood as non-transient, physical media.

Various examples have been described. These and other examples are within the scope of the following claims.

The invention claimed is:

1. A computer-readable storage medium comprising instructions that, when executed, cause a processor of a first client device to:
execute an application at the first client device;
periodically determine a current application state of the application, wherein the current application state includes at least a portion of a current visual representation of the application;
after determining a respective current application state, send, from the first client device to a server device, an indication of the respective determined current application state, wherein the indication of the respective determined current application state comprises information for recreating at least the portion of the current visual representation of the application;
in response to receiving an indication that a different client device is attempting to transmit indications of another application state to the server device, cause the first client device to stop transmission of subsequent indications of the respective determined current application states to the server device to prevent collisions between application state updates from the first client device and application state updates from the different client device; and
after stopping transmission of the subsequent indications of the respective determined current application state, continue to execute the application at the first client device.

2. The computer-readable storage medium of claim 1, wherein the current application state comprises a second application state and wherein a most recently sent indication comprises a second indication associated with the second application state, further comprising instructions that cause the processor to:
prior to determining the second application state, determine a first application state of the application and send a first indication of the sent indications, wherein the first indication is associated with the first application state to the server device; and
after sending the first indication of the sent indications, execute a timer,
wherein the instructions that cause the processor to determine the second application state comprise instructions that cause the processor to determine the second application state after expiration of the timer.

3. The computer-readable storage medium of claim 1, wherein the application comprises a multimedia application presenting multimedia data, the multimedia data comprising at least one of audio and video data, and wherein the current application state comprises a temporal location within the multimedia data that was being played when the current application state was determined.

4. The computer-readable storage medium of claim 1, wherein the application comprises a web browser displaying a web page, and wherein the current application state further comprises a uniform resource locator (URL) of the web page being displayed.

5. The computer-readable storage medium of claim 4, wherein the web browser maintains a plurality of windows, each of the plurality of windows corresponding to a respective web page, and wherein the current application state comprises URLs for each of the respective web pages for the plurality of windows.

6. The computer-readable storage medium of claim 4, wherein the at least portion of the current visual representation comprises a position of the web page being displayed by the web browser.

7. The computer-readable storage medium of claim 1, wherein the application comprises an e-mail application displaying an e-mail document, and wherein the current application state comprises an indication of the displayed e-mail document.

8. The computer-readable storage medium of claim 7, wherein the at least portion of the current visual representation comprises a position of the e-mail document being displayed by the e-mail application.

9. The computer-readable storage medium of claim 1, wherein the first client device comprises a cellular telephone, and wherein the different client device comprises a personal computing device.

10. The computer-readable storage medium of claim 1, wherein the instructions that cause the processor to send the indication of the respective determined current application state comprise instructions that cause the processor to send the indication of the respective determined current application state to the server device without user intervention.

11. The computer-readable storage medium of claim 1, wherein the received indication that the different client device is attempting to transmit indications of another application state to the server device comprises an indication from the server device to stop sending the indication of the respective determined current application state from the first client device to the server device.

12. The computer-readable storage medium of claim 1, wherein the indication comprises a first indication, further comprising instructions that, when executed, cause the processor of the first client device to:
in response to receiving a second indication that the different client is no longer attempting to transmit the indications of the another application state to the server device, resume transmission of the subsequent indications of the current application state to the server device.

13. The computer-readable storage medium of claim 1, wherein the instructions that cause the processor of the first client device to periodically determine and send the indication of the respective determined current application state further comprise instructions that cause the processor of the first client device to:
after sending one of the indications of the respective determined current application states, execute a timing module at the first client device, wherein the timing module determines an amount of time after which to send a subsequent indication of the respective determined current application state; and
at the determined amount of time after sending the one of the indications:
determine a respective current application state; and
send, by the first client device, the subsequent indication of the respective determined current application state to the server device.

14. A client device comprising:
a display;
an interface configured to exchange data with external devices;
a control unit configured to execute an application to cause the display to display a current visual representation of the application, periodically determine a current application state of the application, wherein the current application state includes at least a portion of the current visual representation of the application; and
a state update module configured to send, after the control unit determines a respective current application state, an indication of the respective determined current application state from the device to a server device via the interface, wherein the indication of the respective determined current application state comprises information for recreating at least the portion of the current visual representation of the application,
wherein the control unit is configured to stop transmission of subsequent indications of the respective determined current application state to the server device, in response to receiving an indication that a different client device is attempting to transmit indications of another application state to the server device, to prevent collisions between application state updates from the first client device and application state updates from the different client device, and after stopping transmission of the subsequent indications of the respective determined current application states, continue to execute the application at the first client device.

15. The client device of claim 14, wherein the control unit is further configured to resume transmission of the subsequent indications of the current application state to the server device, in response to a second indication that the different client device is no longer attempting to transmit the indications of the another application state to the server device.

16. The client device of claim 14, further comprising:
a timing module configured to determine an amount of time after which to cause the state update module to send a subsequent indication of the respective determined current application state, and
at the determined amount of time after sending the one of the indications:
determine a respective current application state, and
cause the state update module to send the subsequent indication of the respective determined current application state to the server device.

17. A method comprising:
executing an application at a first client device;
periodically determining a current application state of the application, wherein the current application state includes at least a portion of a current visual representation of the application;
after determining a respective current application state, sending, from the first client device to a server device, an indication of the respective determined current application state, wherein the indication of the respective determined current application state comprises information for recreating at least the portion of the current visual representation of the application;
in response to receiving an indication that a different client device is attempting to transmit indications of another application state to the server device, cause the first client device to stop transmission of subsequent indications of the respective determined current application states to the server device to prevent collisions between application state updates from the first client device and application state updates from the different client device; and
after stopping transmission of the subsequent indications of the respective determined current application state, continue to execute the application at the first client device.

18. The method of claim 17, further comprising:
in response to receiving a second indication that the different client is no longer attempting to transmit the indications of the another application state to the server device, resuming transmission, by the first client device, of the subsequent indications of the current application state to the server device.

19. The method of claim 17, further comprising:
after sending one of the indications of the respective determined current application states, executing a timing module at the first client device, wherein the timing module determines an amount of time after which to send a subsequent indication of the respective determined current application state; and
at the determined amount of time after sending the one of the indications:
determining a respective current application state; and
sending, by the first client device, the subsequent indication of the respective determined current application state to the server device.

* * * * *